US009396426B2

(12) United States Patent
Piersol et al.

(10) Patent No.: US 9,396,426 B2
(45) Date of Patent: *Jul. 19, 2016

(54) PROGRAMMATIC CONTROL OF RFID TAGS

(71) Applicant: Ricoh Company, Ltd., Tokyo (JP)

(72) Inventors: Kurt Piersol, Campbell, CA (US); Ken Gudan, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,424

(22) Filed: Mar. 22, 2013

(65) Prior Publication Data

US 2013/0234835 A1 Sep. 12, 2013

Related U.S. Application Data

(63) Continuation of application No. 11/482,343, filed on Jul. 6, 2006.

(51) Int. Cl.
*G06K 19/00* (2006.01)
*G06K 19/073* (2006.01)
*G06K 19/077* (2006.01)

(52) U.S. Cl.
CPC ...... *G06K 19/07345* (2013.01); *G06K 19/0739* (2013.01); *G06K 19/07381* (2013.01); *G06K 19/07749* (2013.01)

(58) Field of Classification Search
USPC .............................. 235/487, 492; 340/10, 572
See application file for complete search history.

(56) References Cited

U.S. PATENT DOCUMENTS

| | | | |
|---|---|---|---|
| 5,884,425 A | 3/1999 | Baldwin | |
| 5,982,284 A | 11/1999 | Baldwin et al. | |
| 6,025,780 A | 2/2000 | Bowers et al. | |
| 6,112,061 A * | 8/2000 | Rapeli ...................... | H04B 1/48 455/82 |
| 6,677,852 B1 | 1/2004 | Landt | |
| 6,693,513 B2 | 2/2004 | Tuttle | |
| 6,758,000 B2 | 7/2004 | Sandt et al. | |
| 6,768,415 B1 | 7/2004 | Tuttle | |
| 6,847,912 B2 | 1/2005 | Forster | |
| 6,851,617 B2 | 2/2005 | Saint et al. | |

(Continued)

FOREIGN PATENT DOCUMENTS

| | | |
|---|---|---|
| EP | 1622064 A2 | 2/2006 |
| EP | 1662064 A1 | 5/2006 |

(Continued)

OTHER PUBLICATIONS

Office Communication for corresponding European Patent Application No. 07252397.0 mailed Nov. 17, 2008, 5 pages.

(Continued)

*Primary Examiner* — Matthew Mikels
(74) *Attorney, Agent, or Firm* — Kilpatrick Townsend & Stockton LLP

(57) ABSTRACT

Techniques that enable a device to advertise its mode of operation using an RFID tag attached to the device. Techniques are provided for programmatically controlling an RFID tag. An RFID tag attached to a device is programmatically enabled or disabled depending upon the mode(s) of operation of the device. The RFID tag is able to transmit a signal when enabled and not able to transmit a signal when disabled. Using such a controllable RFID tag, a device can efficiently indicate or advertise its mode of operation to an RFID reader or sensor.

22 Claims, 5 Drawing Sheets

(56) References Cited

U.S. PATENT DOCUMENTS

| | | |
|---|---|---|
| 6,863,220 B2 | 3/2005 | Selker |
| 6,867,983 B2 | 3/2005 | Liu et al. |
| 6,914,562 B2 | 7/2005 | Forster |
| 6,940,408 B2 | 9/2005 | Ferguson et al. |
| 6,951,596 B2 | 10/2005 | Green et al. |
| 7,012,504 B2 | 3/2006 | Tuttle |
| 7,293,717 B1 | 11/2007 | Pathmasuntharan et al. |
| 7,408,463 B2 | 8/2008 | Hammond et al. |
| 7,474,211 B2 | 1/2009 | Kramer |
| 7,548,164 B2 | 6/2009 | Guez et al. |
| 2003/0132301 A1 | 7/2003 | Selker |
| 2004/0041714 A1 | 3/2004 | Forster |
| 2005/0020321 A1 | 1/2005 | Rotzoll |
| 2005/0052282 A1 | 3/2005 | Rodgers et al. |
| 2005/0156709 A1 | 7/2005 | Gilbert et al. |
| 2005/0194441 A1* | 9/2005 | Truong ............ 235/385 |
| 2006/0079180 A1 | 4/2006 | Sinivaara |
| 2006/0187046 A1 | 8/2006 | Kramer |
| 2006/0261946 A1 | 11/2006 | Himberger |
| 2007/0075139 A1 | 4/2007 | Hammond et al. |
| 2007/0075140 A1* | 4/2007 | Guez et al. ............ 235/435 |
| 2007/0216531 A1 | 9/2007 | Lee |
| 2008/0006696 A1* | 1/2008 | Piersol et al. ............ 235/451 |
| 2010/0295694 A1 | 11/2010 | Kauffman et al. |

FOREIGN PATENT DOCUMENTS

| | | |
|---|---|---|
| EP | 1876556 A1 | 1/2008 |
| WO | WO 99/05658 A1 | 2/1999 |
| WO | WO 2004003801 A1 | 1/2004 |
| WO | WO 2005008578 A2 | 1/2005 |
| WO | WO 2006031333 A2 | 3/2006 |

OTHER PUBLICATIONS

European Search Report for corresponding European Patent Application No. 07252397.0 mailed Oct. 15, 2007, 7 pages.

Requirement Restriction for U.S. Appl. No. 11/482,343 mailed Aug. 17, 2009, 6 pages.

Non-Final Office Action for U.S. Appl. No. 11/482,343 mailed Dec. 7, 2009, 8 pages.

Final Office Action for U.S. Appl. No. 11/482,343 mailed Apr. 12, 2010, 6 pages.

Advisory Action for U.S. Appl. No. 11/482,343 mailed Jun. 23, 2010, 2 pages.

Non-Final Office Action for U.S. Appl. No. 11/482,343 mailed Oct. 13, 2010, 6 pages.

Final Office Action for U.S. Appl. No. 11/482,343 mailed Jan. 24, 2011, 7 pages.

Non-Final Office Action for U.S. Appl. No. 11/482,343 mailed Jun. 2, 2011, 6 pages.

Non-Final Office Action for U.S. Appl. No. 11/482,343 mailed Oct. 26, 2011, 6 pages.

Final Office Action for U.S. Appl. No. 11/482,343 mailed Mar. 27, 2012, 8 pages.

Non-Final Office Action for U.S. Appl. No. 11/482,343 mailed Aug. 27, 2012, 7 pages.

Final Office Action for U.S. Appl. No. 11/482,343 mailed Feb. 8, 2013, 8 pages.

Non-Final Office Action for U.S. Appl. No. 11/482,343 mailed Jun. 27, 2013, 7 pages.

Final Office Action for U.S. Appl. No. 11/482,343 mailed Jan. 21, 2014, 7 pages.

Office Action mailed Aug. 11, 2014 in U.S. Appl. No. 11/482,343, 7 pages.

Non Final Office Action, mailed on Jun. 9, 2015, U.S. Appl. No. 11/482,343, 8 pages.

Final Office Action for U.S. Appl. No. 11/482,343 mailed on Dec. 1, 2014, 7 pages.

Notice of Allowance for U.S. Appl. No. 11/482,343 mailed Jan. 20, 2016, 7 pages.

Non-Final Office Action for U.S. Appl. No. 11/482,343, mailed on Jun. 9, 2015, 8 pages.

* cited by examiner

PROGRAMMATIC CONTROL OF RFID TAGS

CROSS-REFERENCES TO RELATED APPLICATIONS

This application is a continuation of U.S. patent application Ser. No. 11/482,343 filed on Jul. 6, 2006, the contents of which are incorporated by references herein in its entirety for all purposes.

BACKGROUND OF THE INVENTION

The present invention relates to radio frequency identification (RFID) technology, and more particularly to techniques that enable a device to advertise its mode of operation using an RFID tag attached to the device.

RFID tags are commonly used for inventory control and tracking of objects. It is well known that RFID chips are only readable from a few centimeters away, unless they are coupled to an antenna. However, once properly attached to an antenna, they are then visible from a much greater distance, for example, up to 10 meters in the case of RFID chips in the 2.4 GHz transmission band.

An RFID tag generally comprises a microchip coupled to an antenna. RFID tags are configured to respond to interrogation signals received from an RFID reader. The response signal transmitted from the RFID tag may then be read and used by the reader. An antenna attached to an RFID tag may be used for receiving an interrogation signal from an RFID reader and for transmitting signals in response to the interrogation signal.

Different types of RFID tags are available including active tags, passive tags, battery-assisted passive tags, and the like. An active RFID comprises a battery or other power supply that is used as a partial or complete source of power for the tag's microchip circuitry and antenna. Due to the presence of the battery, active tags can generally be read over longer distances than other tags. Active tags however tend to be physically larger and more expensive than passive tags.

A passive tag does not comprise an onboard power supply such as a battery. The power for a passive tag is supplied by the reader. A passive tag is activated by radio frequency (RF) energy in the interrogation signal transmitted from an RFID reader. A passive RFID tag generally comprises a coiled antenna that forms a magnetic field upon encountering radio waves from a reader. The passive RFID tag draws power from the magnetic coupling. The electrical current induced in the antenna by the incoming radio frequency signal provides enough power for a transponder in the tag to power up and transmit a response. Most passive tags transmit response signals by backscattering the carrier signal from the reader. The antenna in a passive tag may be designed to both collect power from the incoming signal and also to transmit the outbound backscatter signal. Since passive RFID tags do not require batteries, they are much smaller and less expensive than active tags and have a very long life span.

Although several applications presently make use of RFID tags, the ability to control the tags is still quite limited. Accordingly, better techniques are desired for controlling RFID tags that enable the RFID tags to be used for a whole new set of applications.

BRIEF SUMMARY OF THE INVENTION

Embodiments of the present invention provide techniques that enable a device to advertise its mode of operation using an RFID tag attached to the device.

In one embodiment, techniques are provided for programmatically controlling an RFID tag. An RFID tag attached to a device is programmatically enabled or disabled depending upon the mode(s) of operation of the device. The RFID tag is able to transmit a signal when enabled and not able to transmit a signal when disabled. Using such a controllable RFID tag, a device can efficiently indicate or advertise its mode of operation to an RFID reader or sensor.

According to an embodiment of the present invention, techniques are provided for controlling a radio frequency identification (RFID) tag associated with a device, the device capable of operating in at least a first mode and a second mode. Transmission of signals from the RFID tag is enabled when the device is operating in the first mode. Transmission of signals from the RFID tag is disabled when the device is operating in the second mode, wherein the second mode is different from the first mode.

According to an embodiment of the present invention, transmission of signals is disabled by disabling an antenna used by the RFID tag for transmitting signals when the device is operating in the second mode. Disabling the antenna may comprise clamping poles of the antenna to disable the antenna when the device is operating in the second mode. In one embodiment, transmission of signals is disabled by interrupting power of the RFID tag when the device is operating in the second mode.

According to an embodiment of the present invention, enabling transmission of signals comprises generating a first signal that causes transmission of signals from the RFID tag to be enabled when the device is operating in the first mode, and disabling transmission of signals comprises generating a second signal that causes transmission of signals from the RFID tag to be disabled when the device is operating in the second mode. The mode of operation of the device may also be determined.

According to an embodiment of the present invention, a signal is transmitted from the RFID tag when the device is operating in the first mode. The transmitting may comprise receiving, at the RFID tag, an interrogation signal from a reader, and transmitting the signal from the RFID tag in response to the interrogation signal using energy harvested from the interrogation signal.

According to an embodiment of the present invention, techniques are provided for determining a mode of operation of a device. A radio frequency (RF) interrogation signal is transmitted. The device is determined to be operating in a first mode if a signal is received from the device in response to the RF interrogation signal.

According to an embodiment of the present invention, the device may be determined to be operating in a second mode if a signal is not received from the device in response to the RF interrogation signal. An action may be initiated upon determining that the device is operating in the first mode or alternatively in the second mode.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details. For example, embodiments of the present invention have been described below with reference to RFID tags. However, the teachings of the present invention may also be applied to other types of tags that are capable of transmitting electromagnetic signals.

Embodiments of the present invention provide techniques that enable a device to advertise its mode of operation using an RFID tag attached to the device. An RFID tag attached to a device is programmatically enabled or disabled depending upon a mode(s) of operation of the device. Using such a programmatically controllable RFID tag, a device can efficiently indicate or advertise its mode of operation to an RFID reader or sensor.

Figure 1:
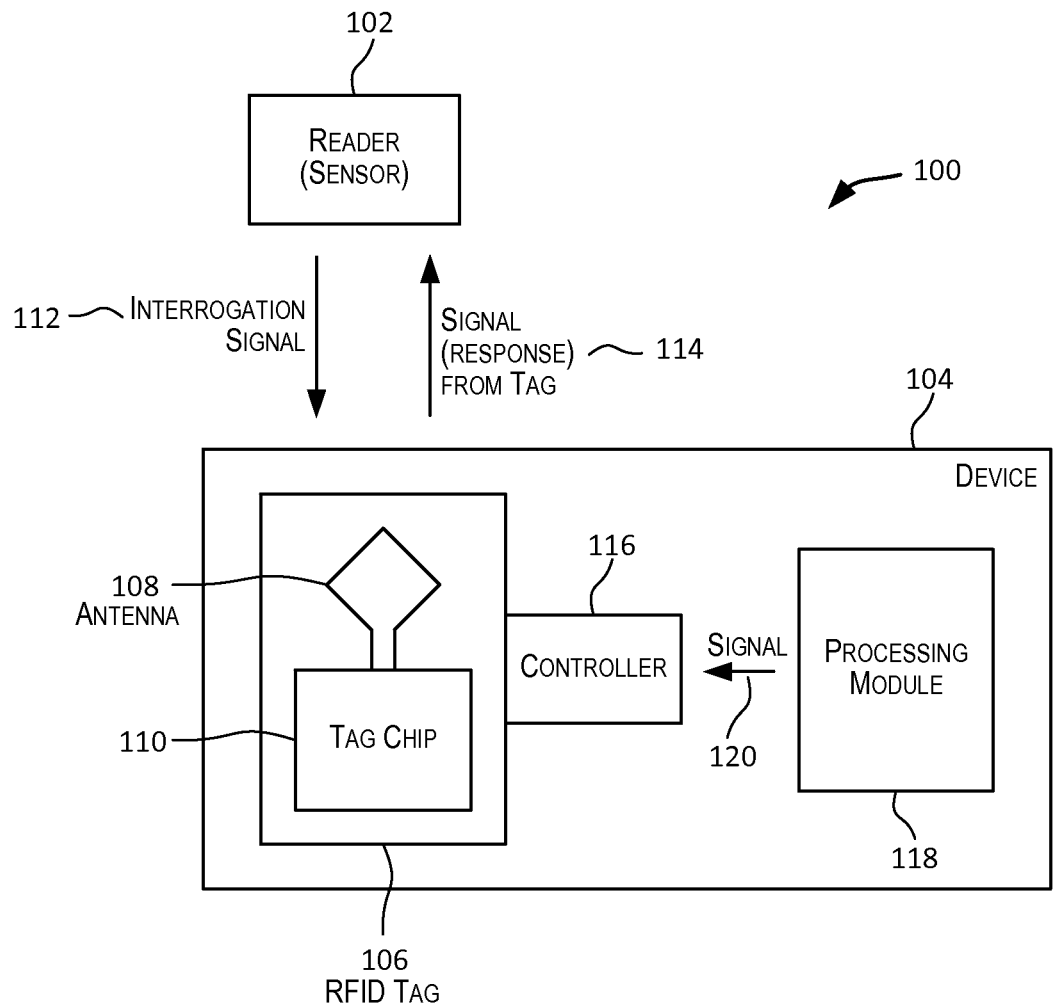
FIG. 1 depicts a simplified block diagram of a system incorporating an embodiment of the present invention.

FIG. 1 depicts a simplified block diagram of a system 100 incorporating an embodiment of the present invention. As depicted in FIG. 1, system 100 comprises a reader (or sensor) 102 and a device 104 comprising an RFID tag 106. Reader 102 may be any apparatus that is capable of receiving signals (e.g., radio frequency signals) transmitted from an RFID tag. In some embodiments, reader 102 may be configured to transmit interrogation RF signals to one or more RFID tags. For example, reader 102 may send an RF interrogation signal 112 to RFID tag 106 using a transmitter and receive a response signal 114 transmitted by RFID tag 106 in response to the interrogation signal using a receiver. Reader 102 may comprise an antenna that facilitates the transmission and reception of RF signals.

In one embodiment, reader 102 may be configured to process the response signal received from RFID tag 106 and initiate performance of one or more actions based upon the processing. The processing may include determining a device mode of operation based upon the response signal and taking appropriate actions. A reader 102 may also be configured to communicate the response signal received from RFID tag 106 to other devices or applications for further processing. Reader 102 may comprise a processor module for performing the processing.

RFID tag 106 is configured to receive RF interrogation signals 112 from one or more readers and to transmit RF response signals in response to the interrogation signals. RFID tags are generally packaged such that they can be easily attached to objects. There are different ways in which RFID tag 106 may be attached to device 104. For example, the RFID tag may be glued to the device, clipped to the device, embedded in the device, included as a component of the device, and the like.

As depicted in FIG. 1, RFID tag 106 comprises an antenna 108 coupled to a tag chip 110. Antenna 108 facilitates reception and transmission of RF signals to and from RFID tag 106. Tag chip 110 may comprise various components that facilitate the functionality of RFID tag 106. These components may include, for example, an RFID transponder, a modulator, a demodulator, a memory (e.g., an EEPROM), control logic, RFID circuitry, etc.

RFID tag 106 may be an active RFID tag, a passive tag, a battery-assisted passive tag, or other type of RFID tag. In the case of an active RFID tag, tag 106 may also comprise a power source such as a battery (not shown). In the case of a passive RFID tag, antenna 108 may be a coiled antenna that is configured to form a magnetic coupling with radio frequency waves received from a reader. The electric current generated from the magnetic coupling may be used to power the passive RFID tag.

RFID tag 106 may be programmatically controlled based upon a mode of operation of device 104. In one embodiment, RFID tag 106 is controlled such that the tag is either enabled or disabled based upon a mode of operation of device 104. When enabled, RFID tag 106 is able to transmit signals from the tag. When disabled, RFID tag 106 is not able to transmit signals from the tag and as a result that tag would appear as if it is not present to an RFID reader. For example, RFID tag 106 may be enabled when device 104 operates in a first mode and may be disabled when device 104 operates in a second mode.

Different techniques may be used to disable or enable RFID tag 106. In one embodiment, a controller apparatus 116 is used to programmatically enable or disable RFID tag 106. Controller 116 may be embodied in various different forms and may include one or more modules or components. Controller 116 may be separate from RFID tag 106 or may be part of RFID tag 106.

Controller 116 is configured to receive a signal representative of or based upon a mode of operation of device 104 and disable or enable RFID tag 106 based upon the signal. For example, controller 116 may receive a first signal when device 104 is operating in a first mode and a second signal when device 104 is operating in a second mode that is different from the first mode. Controller 116 may enable RFID tag 106 upon receiving the first signal and may disable RFID tag 106 upon receiving the second signal. The receipt of the signal and the enabling or disabling of RFID tag 106 is performed automatically without requiring any user action or intervention resulting in RFID tag 106 being programmatically controlled.

In one embodiment, controller 116 may receive the signal that causes RFID tag 106 to be disabled or enabled from a processing module 118. For example, as shown in FIG. 1, controller 116 may receive a signal from a processing module 118 via link 120. Link 120 may be a wired or wireless link. Link 120 may include any mechanism that enables processing module 118 to send a signal, either directly or indirectly, to controller 116 or to RFID tag 106. Link 120 may include multiple links and/or devices. In one embodiment, controller 116 comprises an I/O pin that receives, either directly or indirectly, a signal from processing module 118. The signal received by the I/O pin is representative of the mode of operation of device 104 and causes controller apparatus 116 to disable or enable RFID tag 106.

By controlling the signal that is sent to controller 116, processing module 118 programmatically controls the operation of RFID tag 106. Processing module 118 may be implemented in software (e.g., code or instructions that may be stored on a computer-readable storage medium) executed by a processor, hardware, or combinations thereof. In one embodiment, processing module 118 is configured to determine a mode of operation of the device and send a signal representative of the determined mode to controller 116 such that the signal causes controller 116 to enable or disable RFID tag 106. In another embodiment, processing module 118 may determine the mode of operation of device 104, determine whether RFID tag 106 is to be enabled or disabled based upon the determined mode of operation, and then send an appropriate signal to controller 116 that causes RFID tag 106 to be enabled or disabled. The operations performed by processing module 118 may be performed programmatically without any user intervention. Based upon the signal received from processing module 118, controller 116 is configured to enable or disable RFID tag 106. In this manner, RFID tag 106 is programmatically controlled without requiring any user intervention or action.

The modes of operation for a device may depend on the characteristics and capabilities of the device and may be different for different devices. These modes may be user-configurable in certain embodiments. Whether an RFID tag is to be enabled or disabled for a particular mode of operation for a particular device may also be user-configurable. In one embodiment, RFID tag 106 may be enabled when device 104 is operating in a specific mode (or modes) and disabled when device 104 is not operating in the specific mode or modes. For example, the RFID tag on a device may be enabled when the device is powered on and may be automatically disabled when the device is powered off. In this manner, the RFID tag is programmatically, without requiring an user interaction, enabled or disabled based upon the power-on/power-off mode of the device. As another example, if the device is a camera, the RFID tag on the camera may be enabled to transmit signals when the camera is in an information capture mode (e.g., is in "image capture" mode or "video capture" mode) and may be disabled from transmitting signals when the camera is powered off or not operating in an information capture mode. In this manner, the camera can advertise to a reader that the camera is in information capture mode.

As described above, when an RFID tag is enabled it is capable of transmitting RF signals that may be read by a reader 102. Accordingly, when enabled, the RFID tag is visible to a reader. For example, in the case of a passive RFID tag, the RFID tag may receive an interrogation signal from an RF reader and, if enabled, be able to transmit a response signal by backscattering the interrogation signal from the reader. In the case of an active RFID tag, when enabled, the RFID tag may use the onboard power supply (e.g., a battery) to transmit a signal to the reader. The signal transmitted by an active tag may be transmitted in response to an interrogation signal received by the active tag.

The signal transmitted from an enabled RFID tag 106 may be read by reader 102. Reader 102 may ascertain the operating mode (or modes) of device 104 based upon the received signal. In one embodiment, reader 102 may be preconfigured with information identifying one or more device operation modes for which the RFID tag of the device is enabled. Accordingly, when reader 102 receives a signal from an RFID tag associated with a device, it indicates to reader 102 that the RFID tag is enabled, which in turn indicates that the device is operating in a mode (or modes) for which the RFID tag is enabled. If there is only one device operation mode for which the RFID tag is enabled, then reception of the signal from the RFID tag by reader 102 indicates to reader 102 that the device is operating in that one device operation mode.

In some embodiments, the RFID tag attached to a device may be enabled for more than one mode of operation of the device. In such an embodiment, reception of a response signal from the device RFID tag indicates to reader 102 that the device is operating in at least one of the multiple operation modes for which the RFID tag is enabled. In some embodiments, the signal transmitted from the RFID tag may comprise information that may be used to determine a specific mode of operation of device 104.

A response signal transmitted from RFID tag 106 attached to device 104 and received by reader 102 may also comprise information that may be used by reader 102 to find characteristics of the device. For example, the response signal may comprise information (e.g., an identifier stored in the memory of the RFID tag) identifying the device from which the signal is received, etc.

Reader 102 may initiate one or more actions based upon the response signal received from tag 106. In one embodiment, reader 102 may determine a mode of operation of device 104 based upon the response signal received from RFID tag 106 of the device and initiate one or more actions corresponding to the determined mode.

When an RFID tag is disabled, as described above, it is not capable of transmitting RF signals. For example, if a reader 102 sends an interrogation signal to a disabled RFID tag, the disabled tag will be unable to transmit a signal responsive to the interrogation signal. In this case, reader 102 will not receive any response signal from the RFID tag. The RFID tag is thus not visible to reader 102.

In one embodiment, not receiving a response signal in response to an interrogation signal may also indicate to reader 102 that device 104 is operating in a certain mode(s). For example, when reader 102 knows that a device 104 with an RFID tag is present within reading distance, non-response to an interrogation signal may indicate to reader 102 that device 104 is operating in a mode (or modes) where the RFID tag attached to device is disabled. Reader 102 may be preconfigured with information identifying one or more modes of operation for a device for which the RFID tag of the device is disabled.

Accordingly, by programmatically enabling or disabling an RFID tag 106 associated with a device 104, the device is capable of conveying or advertising information related to its mode of operation. This information may be used by the reader to initiate one or more actions. For example, reader 102 may initiate one or more actions upon determining that device 104 is operating in a particular mode or modes. One or more actions may also be initiated if device 104 is determined to be not operating in a particular mode or modes. In one embodiment, initiation of an action may be performed by reader 102. In other embodiments, reader 102 may convey the information transmitted from device 104 to another device or application which may process the transmitted information and then initiate a responsive action.

Figure 2A:
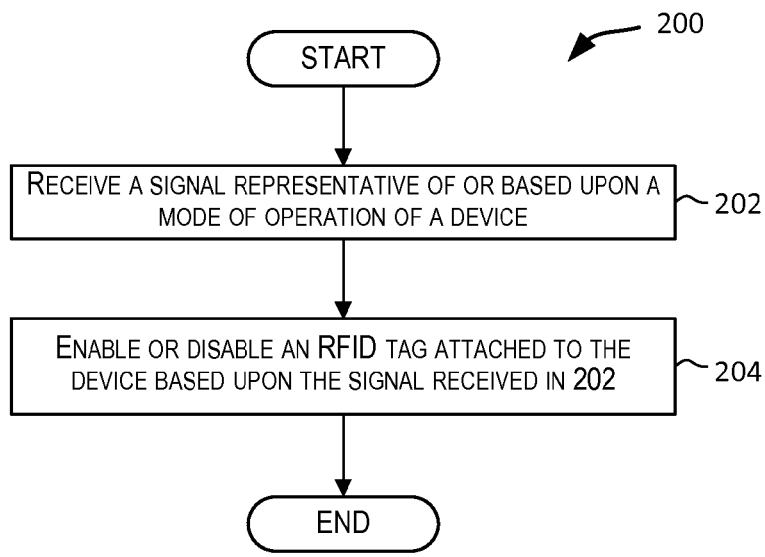
FIG. 2A depicts a simplified flowchart 200 showing processing performed to enable or disable an RFID tag attached to a device according to an embodiment of the present invention.

FIG. 2A depicts a simplified flowchart 200 showing processing performed to enable or disable an RFID tag attached to a device according to an embodiment of the present invention. The processing depicted in flowchart 200 may be performed by hardware modules, software modules (e.g., code or instructions that may be stored on a computer-readable storage medium and executed by a processor), or combinations thereof. As depicted in FIG. 2A, controller 116 receives a signal representative of or based upon a mode of operation of a device (step 202). For example, if a device is operating in a first mode for which the RFID tag attached to the device is to be enabled, then the signal received is such that it represents or is based upon the first mode and which causes the RFID tag attached to the device to be enabled. Controller 116 enables or disables an RFID tag attached to the device based upon the signal received in 202 (step 204). The processing depicted in flowchart 200 is performed automatically without any user input or interaction. In this manner, the RFID tag attached to the device is programmatically controlled based upon a mode of operation of the device. The device is thus able to convey or advertise its mode of operation to a reader.

In the processing depicted in FIG. 2A, controller apparatus 116 may simply receive a signal and disable or enable the RFID tag attached to the device based upon the signal. No specific step is needed to determine the mode of operation of the device or to determine whether the RFID tag is to be disabled or enabled. The mode of operation is inherent or implicit in the signal received by controller apparatus 116 and the RFID tag is automatically enabled or disabled responsive to the signal.

For example, consider a device where the RFID tag for the device is to be enabled when the device is powered (i.e., in power-on mode) and is to be disabled when the device is powered off (i.e., in power-off mode). In this embodiment, controller 116 may receive a signal when the device has power and receive no signal when the device is powered off. This may be done by connecting an input pin of controller 116 to the device power. Accordingly, when the device has power, a signal is received on the input pin of controller 116 that causes the RFID tag to be enabled. When the device is in powered-off mode, no signal is received on the input pin of controller 116 and as a result the RFID tag is disabled. Thus, the signal received by the controller automatically controls whether the RFID tag is enabled or disabled.

Figure 2B:
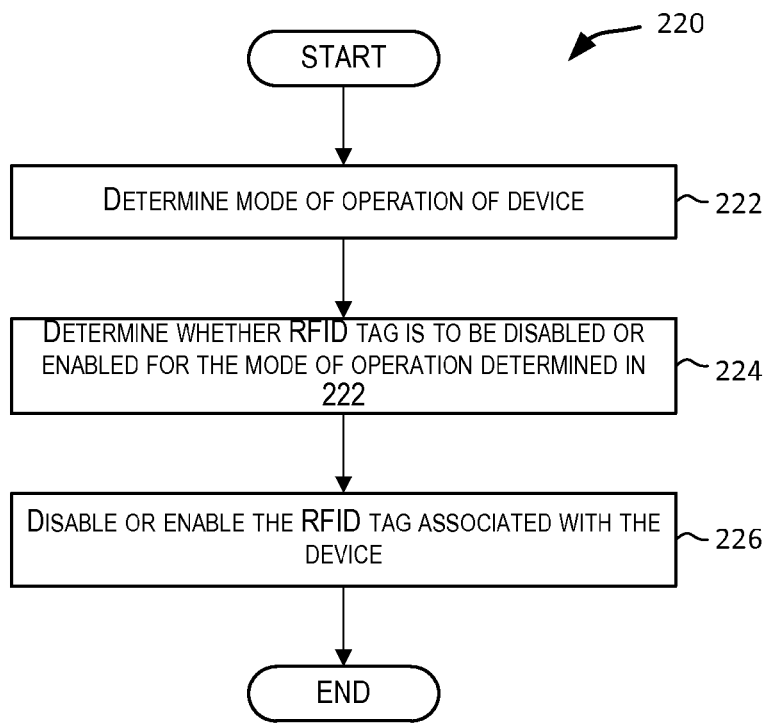
FIG. 2B depicts another simplified flowchart showing processing performed to enable or disable an RFID tag attached to a device according to an embodiment of the present invention.

FIG. 2B depicts another simplified flowchart 220 showing processing performed to enable or disable an RFID tag attached to a device according to an embodiment of the present invention. The processing depicted in flowchart 200 may be performed by hardware modules, software modules (e.g., code or instructions that may be stored on a computer-readable storage medium and executed by a processor), or combinations thereof.

As depicted in FIG. 2B, a mode of operation of a device is determined (step 222). The device mode of operation may be determined by a processing module 118 of device 104. A determination is then made, based upon the mode of operation determined in 222, whether an RFID tag associated with the device is to be enabled or disabled (step 224). In one embodiment, the determination may be made by processing module 118. The RFID tag is then disabled or enabled (step 226). In one embodiment, upon determining that the RFID tag is to be enabled or disabled, processing module 118 may generate and send a signal to controller 116 that causes controller 116 to enable or disable the RFID tag attached to the device.

Figure 3:
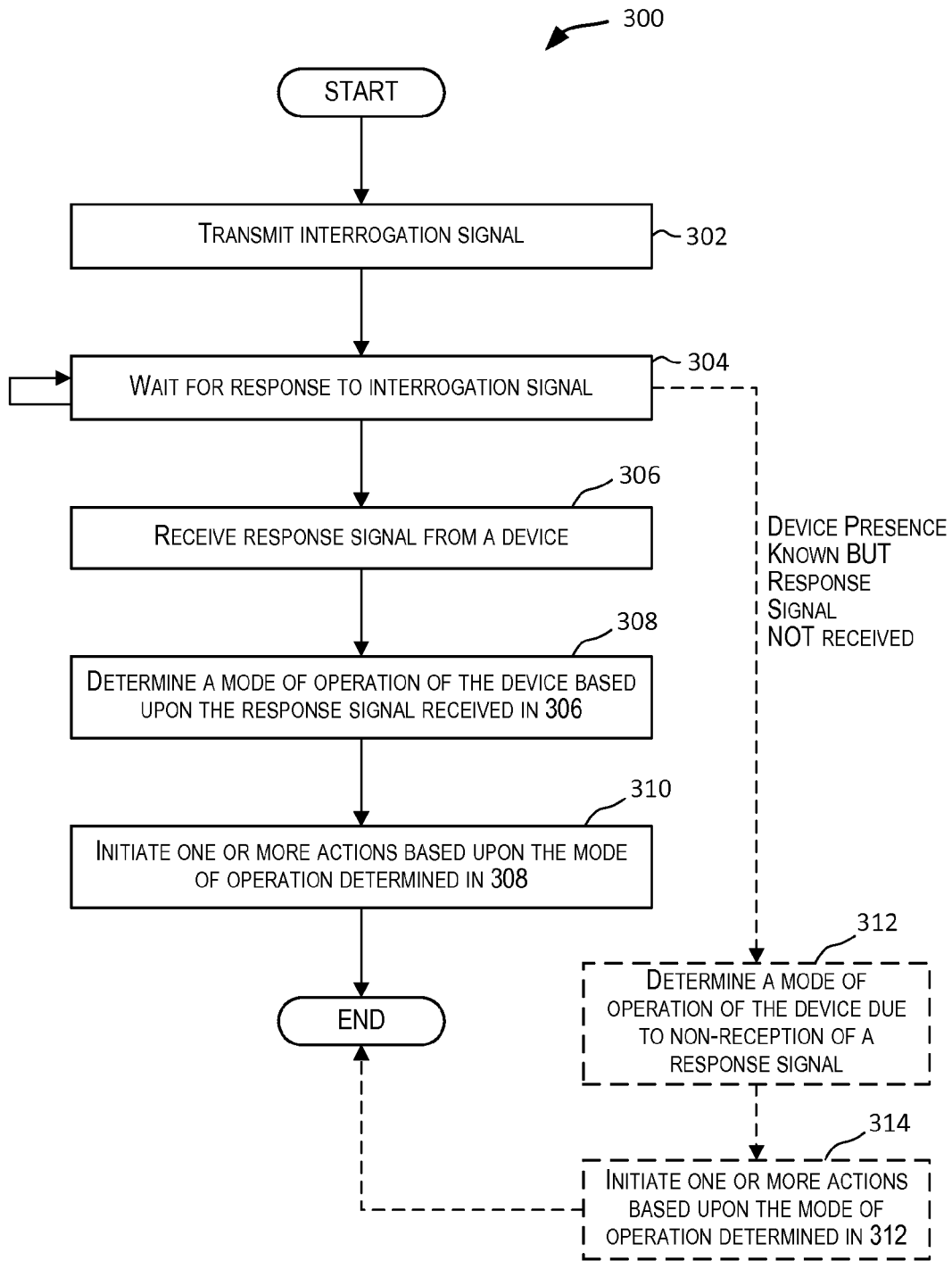
FIG. 3 depicts a simplified flowchart showing processing performed by a reader according to an embodiment of the present invention.

FIG. 3 depicts a simplified flowchart 300 showing processing performed by a reader according to an embodiment of the present invention. The processing depicted in flowchart 300 may be performed by hardware modules of a reader, software modules (e.g., code or instructions that may be stored on a computer-readable storage medium and executed by a processor of the reader), or combinations thereof. The processor of the reader may execute one or more software modules to perform the processing.

As depicted in FIG. 3, a reader may transmit an interrogation signal using a transmitter (step 302). The interrogation signal may be directed towards a specific RFID tag or may be generally transmitted in multiple directions.

The reader then waits to receive a response to the interrogation signal (step 304). The reader may comprise a receiver to receive response signals. The reader may be configured to wait a preconfigured amount of time for a response signal. If the reader receives a response signal (step 306), then the reader may determine a mode of operation of a device that was the source of the response signal (step 308). Receipt of the response signal indicates to the reader that the device from which the response signal was received is operating in a mode for which the RFID tag attached to the device is enabled. In embodiments where the RFID tag attached to the device is enabled for more than one mode of operation, the response signal may comprise information identifying a specific mode of operation of the device.

The reader may initiate one or more actions based upon the mode of operation determined in 308 (step 310). In one embodiment, the response signal may comprise information that may be used to identify the device from which the signal was received.

In some embodiments, non-reception of a response signal may also be relevant to the reader. For example, the reader may know a device with an associated RFID tag is present within reading distance of the reader. As previously stated, the reader may be configured to wait a preconfigured period of time for a response signal. Given that the reader knows about the presence of the device, if the reader does not receive a response signal in the preconfigured time, it indicates to the reader that the device is operating in a mode for which the RFID tag attached to the device is disabled. Accordingly, the reader may determine the mode of operation of the device due to non-reception of a response signal (step 312). The reader may then cause one or more actions to be initiated based upon the mode determined in 312 (step 314).

Various different techniques may be used to disable an RFID tag. In one embodiment this may be done by interrupting the power of the RFID tag, such that without power the RFID tag is disabled and not able to transmit. Many tags available today however have the tag logic and the power harvesting circuitry on-board on the tag chip itself. As a result, for these types of tags, the tag chip has to be programmed to interrupt the power or allow for some other external interruption of power.

According to another technique, an RFID tag may be disabled by disabling the antenna used by the RFID tag to transmit signals. According to an embodiment of the present invention, the antenna of an RFID tag is disabled by clamping together the poles of the antenna under programmatic control. When clamped, this disables the antenna, and as a result the RFID tag cannot harvest power or identify the interrogation signal received from a reader or transmit signals.

Figure 4:
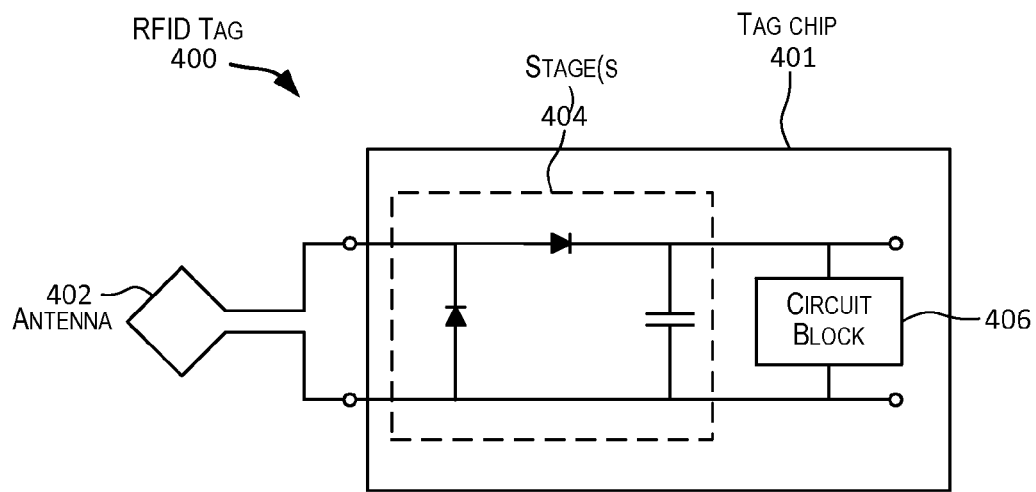
FIG. 4 depicts a simplified block diagram of an RFID tag that may be programmatically controlled according to an embodiment of the present invention.

FIG. 4 depicts a simplified block diagram of an RFID tag 400 that may be programmatically controlled according to an embodiment of the present invention. It should be apparent that RFID tag 400 depicted in FIG. 4 merely illustrates an example of a standard tag that may be used according to an embodiment of the present invention and does not limit the scope of the invention as recited in the claims. RFID tag 400 depicted in FIG. 4 is a passive tag that is configured to harvest RF energy (e.g., interrogation signal) coming in from a reader. Once powered by the incoming energy, RFID tag 400 uses the harvested energy to transmit a response signal to the reader. RFID tag 400 may send the response signal via backscatter. In this manner, RFID tag 400 attached to a device is able to transmit a response signal without requiring any external power source on the RFID tag to power the RFID tag and without using power from the device.

As shown in FIG. 4, RFID tag 400 comprises a tag chip 401 attached to an antenna 402 that is configured to receive and transmit RF signals. Tag chip 401 may comprise one or more stages 404 coupled to a circuit block 406. Each stage 404 may comprise one or more electronic components that enable tag 400 to harvest energy. Stage 404 may be repeated for more power. Circuit block 406 may comprise various components that facilitate the functionality of RFID tag 400. These components may include for example a modulator, a demodulator, a memory (e.g., an EEPROM), control logic, RFID circuitry, etc.

Figure 5:
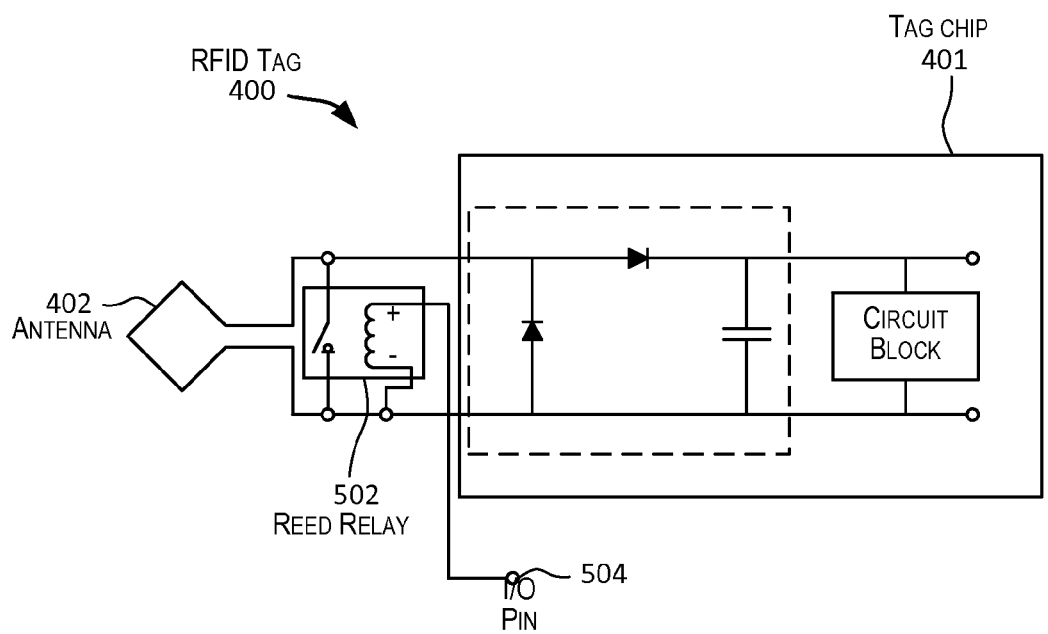
FIG. 5 is a simplified block diagram of a system for programmatically controlling an RFID tag according to an embodiment of the present invention.

As described above, according to an embodiment of the present invention, an RFID tag may be programmatically controlled by disabling the antenna of the RFID tag. Various techniques may be used to disable an antenna. In one embodiment, an antenna is disabled by clamping the antenna. FIG. 5 is a simplified block diagram of a system for programmatically controlling an RFID tag (such as the RFID tag depicted in FIG. 4) according to an embodiment of the present invention. The system depicted in FIG. 5 is merely illustrative of an embodiment incorporating the present invention and does not limit the scope of the invention as recited in the claims. One of ordinary skill in the art would recognize other variations, modifications, and alternatives.

As depicted in FIG. 5, RFID tag 400 comprises antenna 402 coupled to tag chip 401. In the embodiment depicted in FIG. 5, the controller apparatus that is used to automatically enable or disable tag 400 comprises a reed relay 502 coupled to an I/O pin 504. An example of a reed relay is Digikey PN 420-10160ND. Reed relay 502 programmatically clamps the poles of antenna 402 based upon a signal received on I/O pin 504, thereby enabling or disabling antenna 402. The signal received on I/O pin 504 thus determines whether the RFID tag is enabled or disabled.

In the embodiment depicted in FIG. 5, the RFID tag is enabled only when a high signal is received on pin 504. When the signal is high on pin 504, then the poles of antenna 402 are not clamped, thereby enabling the antenna so that RFID tag 400 is able to transmit using antenna 402. When the signal is low on pin 504, then the poles of antenna 402 are clamped, thereby disabling the antenna from transmitting a signal in response to an interrogation signal, which effectively disables RFID tag 400 from being able to transmit a signal. Accordingly, if the device to which the RFID tag is attached operates in a mode for which the RFID tag is to be enabled, then a high signal is input to pin 504 thereby enabling antenna 402 which effectively enables RFID tag 400 to transmit and advertise its mode of operation. If the device operates in a mode for which the RFID tag is to be disabled, then a low signal is input to pin 504 thereby disabling antenna 402 which effectively disables RFID tag 400.

The following table (Table A) summarizes the different states of the RFID tag in response to device power, signal on pin 504, and the reed relay state.

TABLE A

| Device Power | I/O Pin 504 State | Reed Relay State | Tag Transponder |
|---|---|---|---|
| OFF | 0 V | CLOSED | SILENT |
| ON | 0 V | CLOSED | SILENT |
| ON | 5 V | OPEN | RESPONDS |
| OFF | 5 V | Not Applicable | Not Applicable |

As evident from Table A, when the relay is closed, the antenna poles are clamped and as a result the antenna is unable to transmit or receive data, thereby disabling RFID tag 400. When the relay is open, the antenna poles are not clamped and as a result the antenna is able to transmit or receive data, thereby enabling RFID tag 400. The reed relay is open and the RFID tag is enabled and able to transmit and respond to an interrogation signal from a reader only when the I/O pin is driven to 5V (high). The reed relay is closed and the RFID tag is disabled (SILENT) when the I/O pin is 0V (low). In one embodiment, the signal on I/O pin 504 may be driven by a processor module that is configured to determine the mode of operation of the device and based upon the mode generate a signal that appropriately disables or enables the RFID tag. In this manner, the RFID transponder is programmatically controlled without requiring any user intervention. The last row of Table A is not possible (and hence not applicable) since, for the embodiment depicted in FIG. 5, when the device power is off the I/O pin state cannot be driven to 5V.

Figure 6:
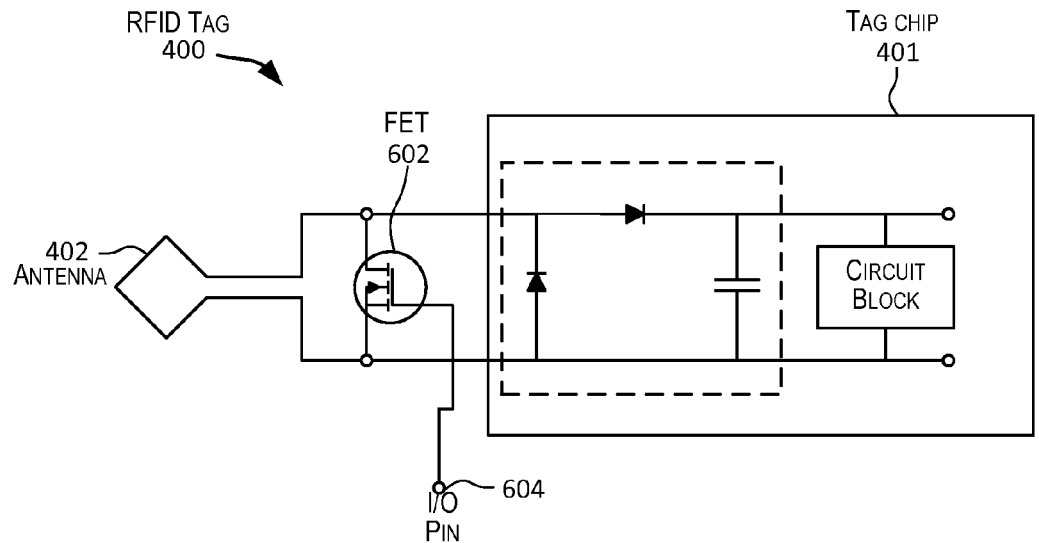
FIG. 6 is another simplified block diagram of a system for programmatically controlling an RFID tag according to an embodiment of the present invention.

FIG. 6 is another simplified block diagram of a system for programmatically controlling an RFID tag according to an embodiment of the present invention. The system depicted in FIG. 6 is merely illustrative of an embodiment incorporating the present invention and does not limit the scope of the invention as recited in the claims. One of ordinary skill in the art would recognize other variations, modifications, and alternatives.

In the embodiment depicted in FIG. 6, the controller apparatus that is used to programmatically disable or enable RFID tag 400 comprises a field effect transistor (FET) 602 connected to pin 604. FET 602 is configured to short or open antenna 402 based upon the signal received on pin 604. In the configuration depicted in FIG. 6, when the signal on I/O pin 604 is low, FET 602 does not conduct, antenna 402 is open, and RFID tag 400 is able to transmit in response to an interrogation signal received from a reader. When signal on I/O pin 604 is high, FET 602 conducts, the poles of antenna 402 are shorted, and RFID tag 400 is unable to transmit and is silent. Accordingly, RFID tag 400 is enabled or disabled based upon the signal provided to I/O pin 604.

In one embodiment, the configuration shown in FIG. 6 may be used to advertise when a device is in power-on mode. In this embodiment, RFID tag is enabled when the device has power (power-on mode) and is disabled when the device does not have power (power-off mode). I/O pin 604 may receive a low signal when the device has power which causes antenna 402 to be open and the RFID tag is able to transmit and advertise the device's power-on mode. I/O pin 604 may receive a high signal when the device is powered-off resulting in antenna 402 being shorted and unable to transmit, thereby disabling RFID tag 400.

Figure 7:
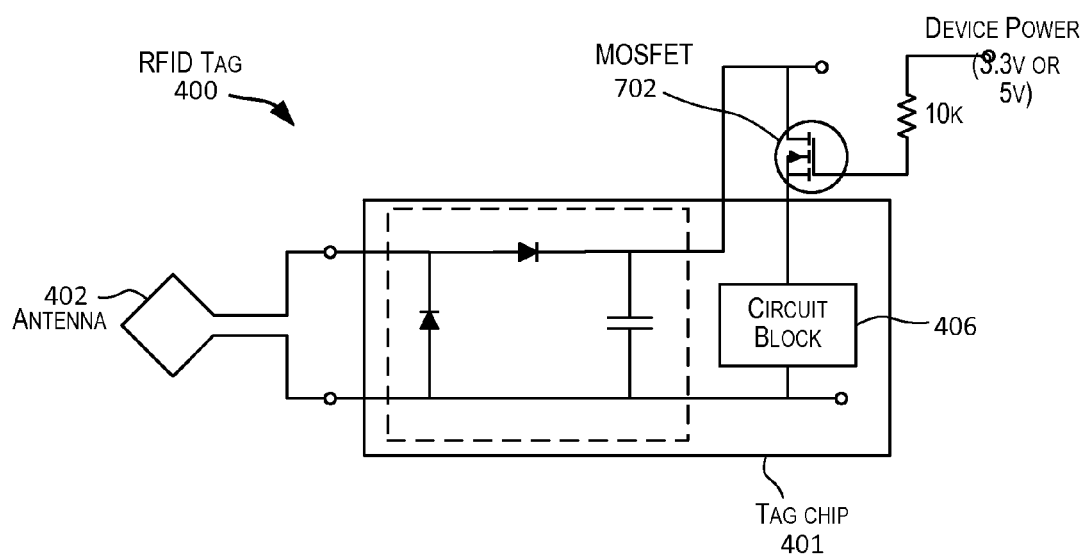
FIG. 7 is a simplified block diagram of a system for programmatically controlling an RFID tag by hindering tag power according to an embodiment of the present invention.

FIG. 7 is a simplified block diagram of a system for programmatically controlling an RFID tag by hindering tag power according to an embodiment of the present invention. The system depicted in FIG. 7 is merely illustrative of an embodiment incorporating the present invention and does not limit the scope of the invention as recited in the claims. One of ordinary skill in the art would recognize other variations, modifications, and alternatives.

The embodiment depicted in FIG. 7 separates power harvesting from RFID tag response circuits, so that the power section is individually accessible. In the embodiment depicted in FIG. 7, the controller apparatus that is used to enable or disable RFID tag 400 comprises a MOSFET 702 (e.g., an n-channel MOSFET (2n7002)) connected to circuit block 406 and the gate of the MOSFET is connected to device power. When the device power is off, the gate control to the MOSFET is low, and there is no power to circuit block 406 because the source/drain are open, and as a result no response (backscatter) can be made to the reader, and the RFID transponder can be silent or disabled. When the device power is on, the gate control is on, current flows between the source and the drain on the MOSFET. and as a result the circuit block 406 is powered (through a slight voltage drop in the FET), and the RFID transponder is able to respond (is enabled).

In the embodiments of the present invention depicted above, the programmatic control of an RFID tag on a device enables the device to advertise or convey information regarding a mode of operation of the device. This may be achieved without requiring any power source for the RFID tag. Advertising of the mode requires extremely little power which may be harnessed from the reader rather than from the device to which the RFID tag is attached. Embodiments of the present invention cause a device to be visible to a reader when the RFID tag attached to the device is enabled. This may be done without costing the device itself any power.

As described above, the transmission capability of an RFID tag may be programmatically controlled. An RFID tag may be disabled by programmatically shutting down the transmission capability of the RFID tag. As a result, the RFID tag is not "always on" and as a result the use of the programmable RFID tag is less intrusive. Further, since an RFID tag may use harvested energy, the device to which the RFID tag is attached does not have to be powered on in order to determine a mode of operation of the device. Programmable RFID tags, as described above may be used in embedded devices. Because embedded devices are always limited by available power, the fact that the reader is expending the power rather than the RFID tag or device itself is of significant value.

An RFID tag of a device could be always on, and always advertising the device's mode of operation. But this may be expensive in terms of power. Embodiments of the invention allow a device to broadcast (communicate) its operating mode without costing the device any power usage at all since the power is harvested from energy received from the reader.

Example Applications

Embodiments of the present invention may be used for a variety of different applications. The applications described below are examples of different ways in which embodiments of the present invention may be used. These examples are not intended to limit the scope of the present invention as recited in the claims.

(1) Security zones: As a first example, embodiments of the present invention may be used for security purposes by allowing a security system to determine operation modes of devices within a security zone and take appropriate actions when a violation occurs. One such application is in the company environment. Because of security and information theft concerns, many companies have made moves to ban any information capture devices (e.g., cell phone cameras, digital cameras) from secure zones on corporate premises. These secure zones may be equipped with RFID readers or sensors that are capable of detecting signals transmitted from RFID tags on devices such as cameras. The devices may be programmed such that the RFID tags on the devices are enabled when the devices are in any information capture mode (e.g., "picture capture" mode, "movie capture" mode). The RFID tags may be disabled in other modes (e.g., when a camera is in output only mode). Before entering a secure zone, a check may be made at a security checkpoint to ensure that only devices that are able to advertise information capture mode are allowed to enter the security area. Once in the secure zone, if a device operates in information capture mode, the sensors in the secure zone are able to read the transmitted signal from the device and thereby detect that the device is in information capture mode. Appropriate actions may be taken upon detecting such a violation. These actions may include writing a log entry for the violation, capturing the location and identity of the violator, etc. In this manner, the unauthorized capture of information may be detected and thereby prevented.

(2) Prevent cell phone noise: The ringing of cell phones during a movie, a play, a performance, etc. is quickly becoming a nuisance. Embodiments of the present invention may be used to request attendees to turn off their cell phones. The cell phones (or other audible devices) may comprise RFID tags that are enabled when the devices are in "audible ring" mode. "Vibrating ring" mode may not enable the RFID tags. Readers may be placed in the auditorium or movie hall to interrogate the cell phones and receive response signals. If a response signal is received from a cell phone, it indicates that the cell phone is in "audible ring" mode and the user of the cell phone may be requested to turn off the cell phone. For example, a sign saying "Please turn off your cell phone" may be flashed to the user. Alternatively, the RFID tag might advertise the phone number of the phone, so that an individualized text or voice message could be sent to the phone asking that it be turned off.

(3) Detection of operation in a hazardous mode: Embodiments of the present invention may also be used to detect when a device is operating in a hazardous or irregular mode. For example, a device may be configured such that the RFID tag attached to the device is enabled when the device operates in a hazardous, irregular, or erroneous mode. When a reader or sensor receives a signal transmitted by such an enabled RFID tag it indicates that the device to which the tag is attached is operating in a hazardous mode. One or more actions may be initiated by the reader upon determining that the device is operating in a hazardous mode. For example, actions may be taken to warn the user of the hazardous condition, such as, flashing a warning that the device is operating in a hazardous way. The RFID tags may be enabled under various hazardous conditions, such as when an electrical device is active during a sensitive experiment, when such a device is operating near open oxygen gas in a hospital, the device has a defect, etc.

As another example, an RFID tag attached to a cell phone may be programmatically enabled when the cell phone is powered on. RFID readers may be provided in an airplane (or other locations where cell phone use is prohibited) to detect cell phones that are on. Users of these cell phones may then be requested to shut off their phones.

As another example, a security guard might carry a gun whose handle contains an RFID tag under programmatic control. In situations where the gun has been drawn and the safety is disabled, the RFID tag would be enabled. A building RFID sensor could then detect such a situation and automatically summon help to the area based on the gun's advertised operating mode.

(4) "Battery-less" remote control: A battery-less controller (e.g., a remote controller) may be provided that enables one or more RFID chips based on controlled inputs. Such a controller could be powered by a photovoltaic cell or even a mechanical charger (e.g., a controller that is powered by shaking it), and comprise a processor to enable or disable the RFID chips. For example, a simple remote control could be composed of several RFID tags, for instance, one tag per digit 0-9, plus a couple of tags for volume and channel controls. Given the low price of tags, the cost of such an apparatus is very low. When a user pushes or selects a button of the remote control, only the tag corresponding to the selected button is enabled for transmission. The reader may be included in a TV or other device that is controlled using the remote control. The reader may generate the RF energy for the remote control, periodically polling to see if any button is selected. If one is selected, the tag corresponding to that button is enabled, and that tag can respond to the reader's inquiry, and then the appropriate action may be taken by the reader. For example, the controller may be a remote controller for controlling a television, DVD player, sound system, etc. In one embodiment, either a single tag or multiple tags may be enabled, in response to user key presses. For example, a controller may have 16 tags, and the device may turn on a multi-bit code, or a series of multi-bit codes in sequence. In the case of a series, one would wait a specified time after the query pulse from the reader before changing the tag states to transmit the next multi-bit code.

(5) Multiple RFID tags on a device: A device may be equipped with multiple RFID tags. For example, a device such as a camera may comprise a first tag that is always enabled and which advertises over a short-range that the device to which the tag is attached is capable of broadcasting its operating mode. A second RFID tag may be attached to the camera. This second tag may be a longer range tag, which under programmatic control is either enabled or disabled, and is capable of responding with the operating mode of the device.

(6) Use in applications where privacy is of concern: Privacy considerations make some people uncomfortable with RFID technology because the RFID tags (e.g., passive tags) are always on and may be read by an unauthorized reader. As described above, according to embodiments of the present invention, an RFID tag is programmatically enabled or disabled. Accordingly, the RFID tag may be enabled or turned on only when needed and may be disabled in other modes. This may alleviate many of the privacy concerns associated with the "always on" nature of RFID tags.

A rewritable RFID tag without programmatic control always transmits an identifier in response to a reader query. This means that it is always detectable at a distance. A person concerned with privacy might worry that their location will be tracked through such a device, whether they wish to advertise their presence or not. A programmatically controlled RFID tag, on the other hand, does not respond at all unless the operating mode dictates a response. Users can worry less about unintended tracking, because they are in control of the device's operating mode.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of controlling a radio frequency identification (RFID) tag associated with a device, the device being capable of operating in at least a first mode and a second mode, the method comprising:
    upon a change in operating mode of the device from the first mode to the second mode, receiving, at a controller apparatus coupled to the RFID tag, a first indication that the device is operating in the second mode;
    enabling, by the controller apparatus, based on the first indication, transmission of signals by the RFID tag, wherein the RFID tag is a passive RFID tag, and
    wherein the enabling comprises unclamping two poles of an antenna of the RFID tag.

2. The method of claim 1 further comprising:
    upon the device returning to operating in the first mode, receiving a second indication at the controller apparatus; and
    disabling, by the controller apparatus, based on the second indication, transmission of signals by the RFID tag.

3. The method of claim 2 wherein the disabling comprises clamping the two poles of the antenna of the RFID tag together.

4. The method of claim 2 wherein the first indication corresponds to logic high and the second indication corresponds to logic low.

5. The method of claim 1 further comprising:
    transmitting a signal from the RFID tag when the device is operating in the second mode.

6. The method of claim 5 wherein the transmitting comprises:
    receiving, at the RFID tag, an interrogation signal from a reader; and
    transmitting the signal from the RFID tag in response to the interrogation signal using energy harvested from the interrogation signal.

7. The method of claim 2 wherein the first and the second indications are generated by a mode detection module coupled to the device.

8. The method of claim 1 wherein the controller apparatus comprises a reed relay.

9. The method of claim 2 wherein:
    the controller apparatus comprises a reed relay; and
    the first indication causes the reed relay to be placed in an open state and the second indication causes the reed relay to be placed in a closed state.

10. A system comprising:
    a device configured to operate in a first mode and a second mode different from the first mode;
    a passive radio frequency identification (RFID) tag coupled to the device; and
    a controller apparatus coupled to the RFID tag;
    wherein the controller apparatus is configured to:
        upon a change in operating mode of the device from the first mode to the second mode, receive a first indication that the device is operating in the second mode; and
        enable, based on the first indication, transmission of signals by the RFID tag by unclamping two poles of an antenna of the RFID tag.

11. The system of claim 10 wherein the controller apparatus is further configured to:
    receive a second indication when the device is operating in the first mode; and
    disable, based on the second indication, transmission of signals by the RFID tag.

12. The system of claim 11 wherein the controller apparatus is configured to disable transmission of signals by the RFID tag by clamping the two poles of the antenna of the RFID tag together.

13. The system of claim 10 wherein the controller apparatus comprises a reed relay.

14. The system of claim 11 wherein:
the controller apparatus comprises a reed relay; and
the reed relay is placed in an open state upon receipt of the first indication and the reed relay is placed in a closed state upon receipt of the second indication.

15. The system of claim 10 wherein the RFID tag is configured to:
receive an interrogation signal from a reader;
harvest energy from the interrogation signal; and
transmit a signal in response to the interrogation signal using the energy harvested from the interrogation signal.

16. The system of claim 11 wherein the first indication corresponds to logic high and the second indication corresponds to logic low.

17. The system of claim 10 wherein the RFID tag is configured to:
transmit a signal when the device is operating in the second mode.

18. The system of claim 11 further comprising:
a mode detection module coupled to the device and configured to generate the first and the second indications.

19. The method of claim 1, wherein the device is capable of performing a function in the second mode and not capable of performing the function in the first mode.

20. The method of claim 1, wherein the device is powered in the second mode and the device is not powered in the first mode.

21. The system of claim 10, wherein the device is capable of performing a function in the second mode and not capable of performing the function in the first mode.

22. The system of claim 10, wherein the device is powered in the second mode and the device is not powered in the first mode.

* * * * *